(12) United States Patent
Saika

(10) Patent No.: US 7,100,077 B2
(45) Date of Patent: Aug. 29, 2006

(54) CONTROL SYSTEM OF NAS, BACKUP METHOD, AND PROGRAM THEREFOR

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 10/892,293

(22) Filed: Jul. 16, 2004

(65) Prior Publication Data
US 2005/0223278 A1 Oct. 6, 2005

(30) Foreign Application Priority Data
Mar. 25, 2004 (JP) .............................. 2004-089305

(51) Int. Cl.
G06F 11/00 (2006.01)
(52) U.S. Cl. .................... 714/15; 714/4; 714/6; 714/13
(58) Field of Classification Search .................... 714/4, 714/5, 6, 7, 8, 9, 13, 15
See application file for complete search history.

(56) References Cited

U.S. PATENT DOCUMENTS

| | | | |
|---|---|---|---|
| 6,154,852 A | 11/2000 | Amundson | |
| 6,658,589 B1 | 12/2003 | Taylor | |
| 6,728,848 B1 | 4/2004 | Tamura et al. | |
| 6,834,326 B1* | 12/2004 | Wang et al. | 711/114 |
| 6,886,086 B1 | 4/2005 | Kobayashi et al. | |
| 6,957,291 B1* | 10/2005 | Moon et al. | 714/6 |
| 2001/0042221 A1* | 11/2001 | Moulton et al. | 714/5 |
| 2003/0079018 A1* | 4/2003 | Lolayekar et al. | 709/226 |
| 2003/0135782 A1* | 7/2003 | Matsunami et al. | 714/5 |
| 2004/0010732 A1* | 1/2004 | Oka | 714/13 |
| 2004/0078534 A1 | 4/2004 | Scheid | |
| 2004/0158764 A1* | 8/2004 | Sonoda et al. | 714/4 |
| 2004/0236984 A1 | 11/2004 | Yamasaki | |
| 2005/0071390 A1* | 3/2005 | Midgley et al. | 707/204 |
| 2005/0138461 A1* | 6/2005 | Allen et al. | 714/4 |

FOREIGN PATENT DOCUMENTS

JP 2000-353104 12/2000

\* cited by examiner

Primary Examiner—Robert W. Beausoliel, Jr.
Assistant Examiner—Joseph D Manoskey
(74) Attorney, Agent, or Firm—Antonelli, Terry, Stout and Kraus, LLP.

(57) ABSTRACT

To provide a backup method that allows a reliable backup when a fault occurs in a way that improves a backup speed. The backup method for requesting a backup system to back up files (31) stored on a predetermined NAS of plural NASs (1 and 2) in response to a backup request given from a client computer, includes: selecting backup target files based on the backup request given from the client computer; allocating the selected backup target files (31) respectively to the plural NASs (1 and 2); and causing the respective NASs to request the backup system to back up the allocated files (31) in parallel (102 and 202).

20 Claims, 10 Drawing Sheets

| DATE | PROCESSING TIME | FILE SIZE |
|---|---|---|
| 2004/01/16 | 600sec. | 20GB |
| ▼ | ⋮ | ⋮ |

FIG. 8

| FILE NAME | FILE SIZE |
|---|---|
| a.txt | 100 |
| b.txt | 80 |
| c.txt | 50 |
| d.txt | 30 |
| e.txt | 10 |

FIG. 9A

BACKUP TARGET LIST : L1

| FILE NAME | FILE SIZE |
|---|---|
| a.txt | 100 |
| b.txt | 80 |

FIG. 9B

BACKUP TARGET LIST : L2

| FILE NAME | FILE SIZE |
|---|---|
| c.txt | 50 |
| d.txt | 30 |
| e.txt | 10 |

FIG. 9C

CONTROL SYSTEM OF NAS, BACKUP METHOD, AND PROGRAM THEREFOR

CLAIM OF PRIORITY

The present application claims priority from Japanese application P2004-89305 filed on Mar. 25, 2004, the content of which is hereby incorporated by reference into this application.

BACKGROUND

The present invention relates to an improvement of a technology of backing up files stored on a NAS(Network Attached Storage).

A technology known, in which when the backup is conducted by use of plural computers, if a fault occurs on one computer, the other computer resumes the backup (refer to, e.g., JP 2000-353104 A).

Further, in this example, if the fault occurs on one computer, the other computer resumes the backup after rewinding a tape drive.

SUMMARY

According to the prior art described above, however, though the plural computers are employed when performing the backup, the other computer does not back up unless the fault occurs on one computer. Therefore, a length of time expended for the backup is the same as in a case where the backup is carried out by the single computer. Thus, a problem arises in that a backup speed cannot be improved.

Moreover, if the fault occurs on one computer, the backup is resumed after rewinding the tape drive, resulting in a problem in that the time expended for the backup is further elongated.

It is therefore an object of the present invention, which was devised in view of the problems described above, to perform a reliable backup when a fault occurs in a way that improves a backup speed.

According to the present invention, there is provided a backup method for requesting a backup system to back up files stored on a predetermined NAS of plural NASs in response to a backup request given from a client computer, including: selecting backup target files based on the backup request given from the client computer; allocating the selected backup target files respectively to allocate plural NASs; and causing the respective NASs to request the backup system to back up the allocated backup target files in parallel.

Further, when the fault occurs on any one of the NASs, another NAS takes over the backup of the files, at or after a point of time when the fault occurred.

Hence, according to the present invention, since the backups can be conducted in parallel by the plural NASs, the backup speed can be remarkably improved.

Moreover, even when the fault occurs, the other NAS takes over the backup of the files at or after the point of time when the fault occurred, and therefore the backup speed can be improved while ensuring the reliability.

BRIEF DESCRIPTION OF THE DRAWINGS

FIG. 8 is an explanatory diagram showing an example of log information.

FIGS. 9a to 9c are explanatory diagrams showing how a backup target list is created from a temporary file list, wherein FIG. 9a shows the temporary list, FIG. 9b shows a file list L1 of the NAS 1, and FIG. 9c shows a file list L2 of the NAS 2.

DETAILED DESCRIPTION OF THE PREFERRED EMBODIMENTS

An embodiment of the present invention will hereinafter be described with reference to the accompanying drawings.

Figure 1:
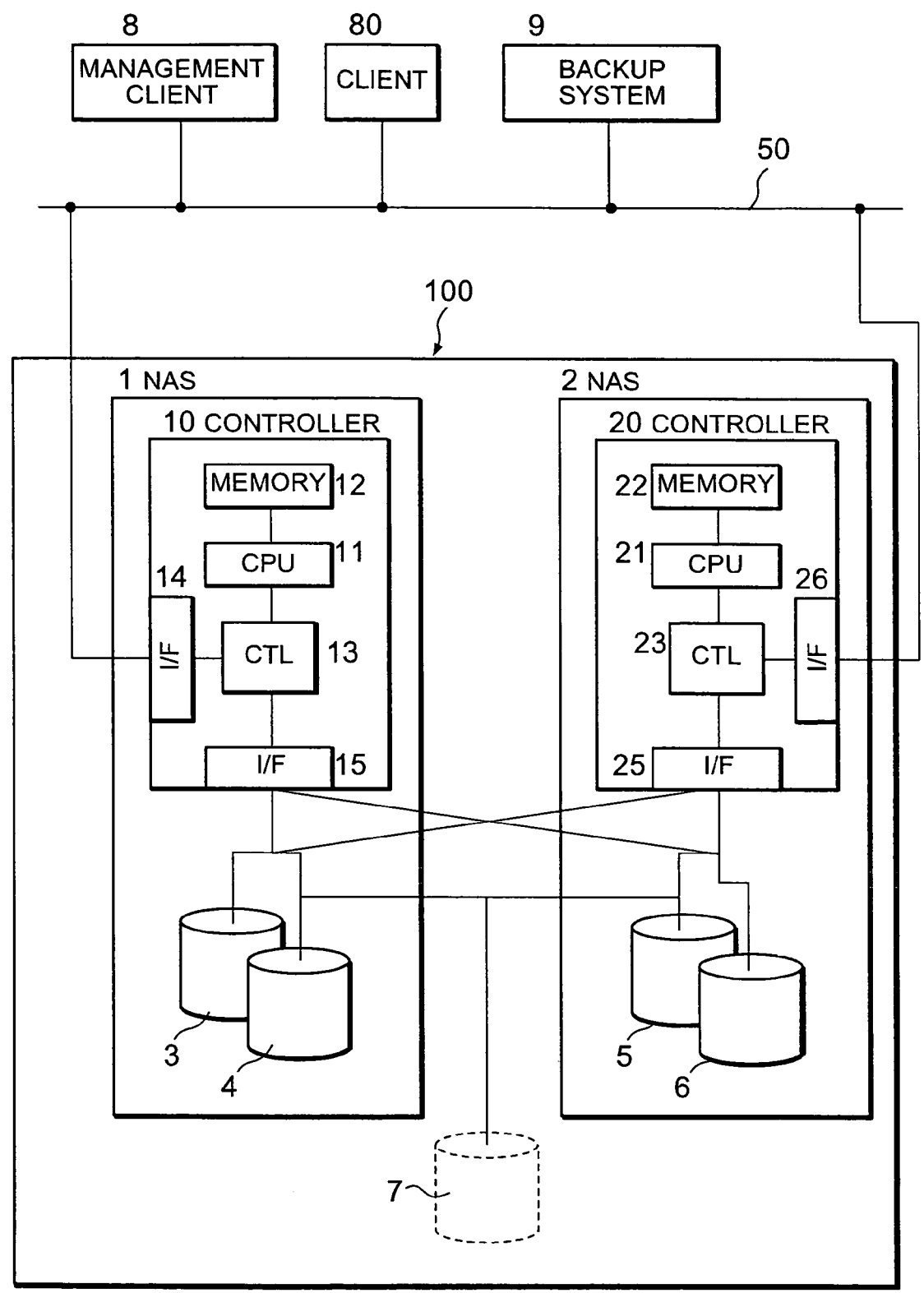
FIG. 1 is a block diagram showing a whole system architecture.
Figure 2:
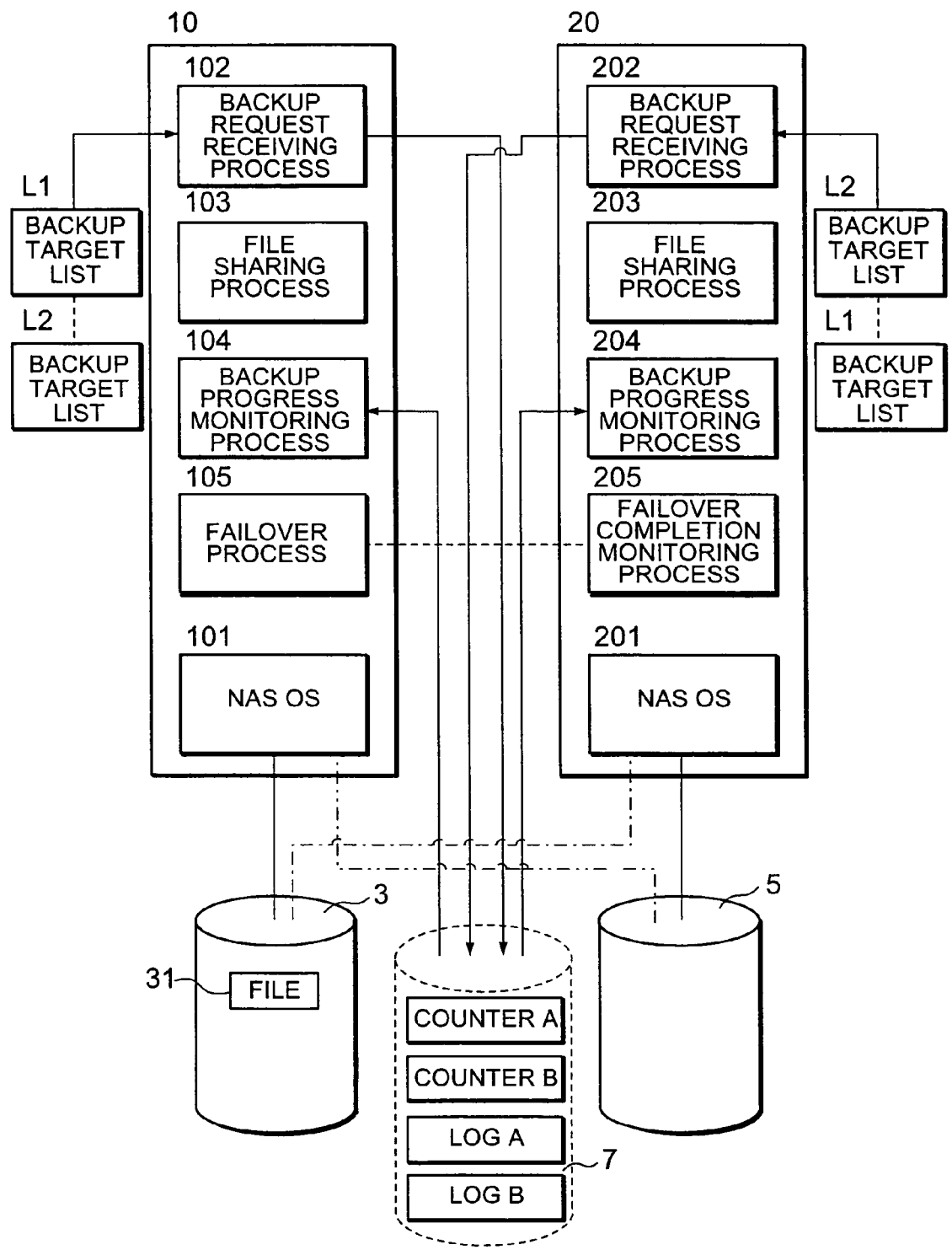
FIG. 2 is a block diagram showing an architecture of software executed by a controller of each NAS.

FIG. 1 is a block diagram showing a whole architecture of a system in which the present invention is applied to a NAS (Network Attached Storage) system. FIG. 2 is a block diagram showing a software architecture of a NAS 1 and a NAS 2.

Referring to FIG. 1, a NAS cluster 100 is constructed of plural pieces of NAS 1 and NAS 2, and is recognized as the single NAS 1 as viewed from a management client computer 8 and a client computer 80 that are connected via a network 50 to the NAS cluster 100. This architecture exemplifies a case in which the NAS 1 is a main storage system at a normal time, and the NAS 2 becomes a client to the NAS 1.

The NAS 1 is built up by including disk drives 3 and 4 and a controller 10 for controlling these disk drives 3 and 4. Further, the NAS 1 is connected via the network 50 to the management client computer 8 that requests the NAS 1 for a backup, also to a backup system 9 for executing the backup, and further to the client computer 80 that requests the NAS 1 to write (update) and read (reference) data.

The NAS 2 is built up by including disk drives 5 and 6 and a controller 20 for controlling these disk drives 5 and 6. Further, similarly to the NAS 1, the NAS 2 is connected via the network 5050 to the management client computer 8, to the backup system 9, and further to the client computer 80.

The management client computer 8 requests the NAS 1 to back up a preset file on the backup system 9.

It should be noted that preset file systems are built up in the respective disk drives 3 through 6.

Further, the management client computer 8 and the client computer 80 are, although not illustrated, provided with CPUs, memories, interfaces connected to the network 50, display devices, and input devices.

The NAS 1 and the NAS 2, which configure the NAS cluster 100, are connected to each other and execute the backup in parallel, while when a fault occurs on the NAS 1, the NAS 1 executes a failover process to take over the backup to the NAS 2.

Further, the controller 10 of the NAS 1 includes a CPU 11, a memory 12, a data transfer controller 13, a network interface 14, and an interface 15 for storage. It should be noted that the memory 12 may be provided with a data cache (not shown), or the data cache may also be provided on the data transfer controller 13.

A control program (see FIG. 2) is loaded into the memory 12, and the CPU 11 accesses and executes the control program, thereby executing a variety of processes which will hereinafter be described.

The data transfer controller 13 transfers the data among the CPU 11, the network interface 14, the storage interface 15, and the memory 12.

The NAS 2 and the NAS 1 have the same architecture, in which a controller 20 of the NAS 2 includes a CPU 21, a memory 22, a data transfer controller 23, a network interface 24, and an interface 25 for storage. It should be noted that the memory 22 may be provided with a data cache (not shown), or the data cache may also be provided on the data transfer controller 23.

A control program (see FIG. 2) is loaded into the memory 22, and the CPU 21 accesses and executes the control program, thereby executing a variety of processes which will hereinafter be described.

The data transfer controller 23 transfers the data among the CPU 21, the network interface 24, the storage interface 25, and the memory 22.

Further, a disk interface 15 of the NAS 1 is connected to the disk drives 5 and 6 of the NAS 2 as well as to the disk drives 3 and 4 of the NAS 1, wherein the disk drives 5 and 6 of the NAS 2 can be mounted.

Similarly, a disk interface 25 of the NAS 2 is connected to the disk drives 3 and 4 of the NAS 1 as well as to the disk drives 5 and 6 of the NAS 2, wherein the disk drives 3 and 4 of the NAS 1 can be mounted.

Then, the NAS cluster 100 is provided with a shared logical disk 7 that can be referenced and updated from both the NAS 1 and the NAS 2. The shared logical disk 7 is set in an area of any one of the physical disk drives 3 through 6.

FIG. 2 shows function blocks of the control program executed respectively by the controller 10 of the NAS 1 and by the controller 20 of the NAS 2.

To begin with, a NAS_OS 101 of the NAS 1 manages the execution of each control program, and monitors each control program of a file sharing process 103, a backup request receiving process 102, a backup progress monitoring process 104, and a failover process 105, which will be explained later on. These pieces of software run under the management of the NAS OS 101.

This is the same with the controller 20 of the NAS 2, and a NAS_OS 201 thereof manages the execution of each control program, and monitors each control program of a file sharing process 203, a backup request receiving process 202, a backup progress monitoring process 204, and a failover monitoring process 205, which will be explained later on. These pieces of software run under the management of the NAS_OS 201.

The control executed by each of the controllers 10 and 20 of the NAS 1 and the NAS 2 will be outlined, and thereafter each control will be discussed in depth.

It should be noted that this embodiment exemplifies, as shown in FIG. 2, the case where a file 31 stored on the disk drive 3 of the NAS 1 is backed up on the backup system 9.

<File Sharing Process>

The file sharing process 103 on the NAS 1 executes reading and writing a requested file on the side of the network 50 in response to an access request (referencing or updating) from the management client computer 8 and the client computer 80. Further, the file sharing process 103 enables the files on the disk drives 3 and 4 to be referred to or updated from the NAS 2, and makes it possible to reference or update the files on the disk drives 5 and 6 of the NAS 2. Moreover, the file sharing process 103 enables the files on the shared logical disk 7 to be referenced and updated from both the NAS 1 and the NAS 2.

The file sharing process 203 on the NAS 2 executes, similarly to the file sharing process 103 of the NAS 1, reading and writing a requested file on the side of the network 50 in response to an access request from the management client computer 8 and the client computer 80. Further, the file sharing process 203 enables the files on the disk drives 5 and 6 to be referenced or updated from the NAS 1, and makes it possible to reference or update the files on the disk drives 3 and 4 of the NAS 1. Moreover, the file sharing process 203 enables the files on the shared logical disk 7 to be referenced and updated from both the NAS 1 and the NAS 2.

<Backup Request Receiving Process>

The backup request receiving process 102 on the NAS 1 receives the backup request from the management client computer 8, and, as will be described later on, proportionally divides the backup request target files into those for the NAS 1 and the NAS 2. Then, the backup request receiving process 102 transmits to the NAS 2 a file list L1 and a file list L2 of the files to be backed up respectively therein. Further, the backup request receiving process 102 sets a counter A corresponding to a file count of the file lists L1 and also sets a counter B corresponding to a file count of the file lists L2.

A backup request receiving process 202 on the NAS 2 is different in terms of receiving the backup request from the backup request receiving process 102 on the NAS 1.

The backup request receiving process 102 on the NAS 1 executes the backup based on the file list L1. The backup request receiving process 202 on the NAS 2 executes the backup based on the file list L2. Then, the backup request receiving process 102, upon completion of the backup of one file, decrements the counter A on the shared logical disk 7. Similarly, the backup request receiving process 202 on the NAS 2, upon completion of the backup of one file, decrements the counter B on the shared logical disk 7.

Moreover, the NAS 1, when the backup has been completed, writes Log information LogA to the shared logical disk 7. Similarly, the NAS 2, when the backup has been completed, writes Log information LogB to the shared logical disk 7.

It should be noted that the backup target file is prevented from being updated by utilizing a known snapshot technology, split of mirroring, etc. when executing the backup.

<Backup Progress Monitoring Process>

The backup progress monitoring process 104 on the NAS 1 monitors the counter B on the shared logical disk 7 and, if the counter B is not updated for a fixed period of time, judges that a fault occurs on the NAS 2. Then, when detecting the fault on the NAS 2, as will be explained later on, the file list L2, which is initially scheduled to be backed up by the NAS 2, is now backed up based on the counter B by the NAS 1.

Likewise, the backup progress monitoring process 204 on the NAS 2 monitors the counter A on the shared logical disk 7 and, if the counter A is not updated for a fixed period of time, judges that a fault occurs on the NAS 1.

Then, when detecting the fault on the NAS 1, as will be explained later on, after terminating the failover process on the NAS 1, the file list L1, which is initially scheduled to be backed up by the NAS 1, is now backed up by the NAS 2.

Both the backup request receiving processes 102 and 202 on the NAS 1 and the NAS 2 retain the file lists L1 and L2. As described above, when the fault occurs on one controller, the other controller can resume the backup based on the lists L1 and L2 and on the counters A and B on the shared logical disk 7. This scheme enables the backup request from the management client computer 8 to be surely processed.

<Failover Process and Failover Completion Monitoring Process>

The failover process 105 on the NAS 1, when the fault occurs on the NAS 1, transfers an address (such as an IP address, etc.) to the NAS 2 and at the same time frees up the disk drive 3 that has been mounted by the NAS_OS 101 on the NAS 1.

The NAS 2 is a client to the NAS 1, and the backup target file 31 is stored on the disk drive 3 managed by the NAS 1. Hence, when the fault occurs on the NAS 2, the backup progress monitoring process 104 on the NAS 1 can take over the backup of the file list L2 without waiting for the failover of the NAS 2.

By contrast, when the fault occurs on the NAS 1, the backup progress monitoring process 204 on the NAS 2, after waiting for completion of the failover process on the NAS 1, mounts the disk drive 3 managed by the NAS 1 onto the NAS 2. Thereafter, the backup is executed on the NAS 2 on the basis of the file list L1 and the counter A.

Therefore, the failover completion monitoring process 205 on the NAS 2 queries the NAS 1 (about detection of heartbeats (control signals for synchronization), etc.) or detects whether the failover process 105 on the NAS 1 has been completed or not by referencing the log information, etc.

The first embodiment exemplifies a case in which the failover completion monitoring process 205 on the NAS 2 judges that the failover process 105 on the NAS 1 is completed when a predetermined time has elapsed since the counter A on the shared logical disk 7 got non-updated.

Given next below is detailed description of the control executed by each of the controllers 10 and 20 of the NAS 1 and the NAS 2 shown in FIG. 2.

<Backup Request Receiving Process 102 on NAS 1>

Figure 3:
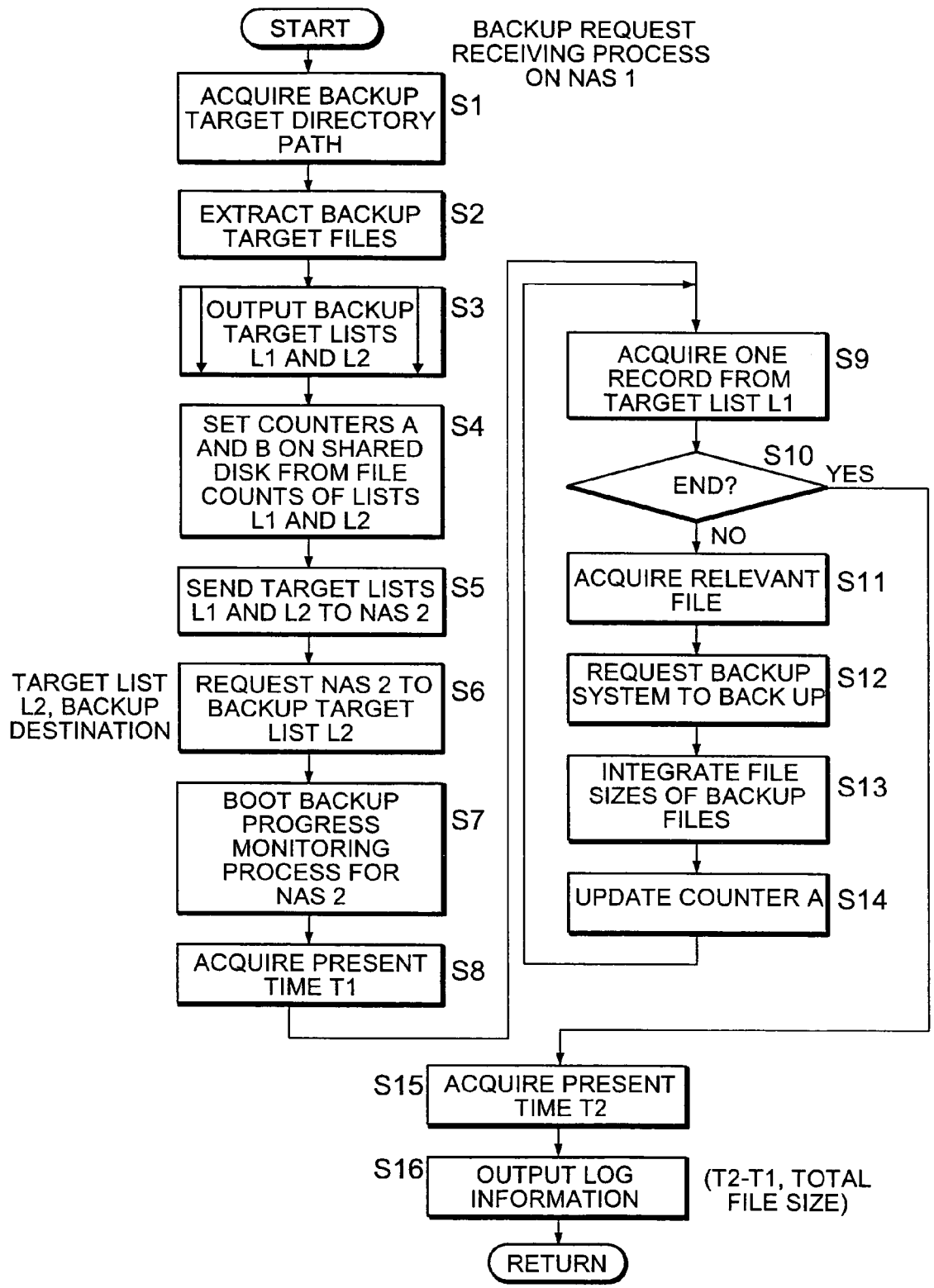
FIG. 3 is a flowchart showing an example of a backup request process executed by the controller of a NAS 1.

FIG. 3 is a flowchart showing an example of the backup request receiving process 102 executed by the controller 10 of the NAS 1. The backup request receiving process 102 is executed when the controller 10 receives the backup request from the management client computer 8.

In S1, the controller 10 acquires a backup target directory path out of the received backup request received from the management client computer 8. It should be noted that the directory path of the file 31 of the disk drive 3 managed by the NAS 1 is set as a backup target.

In S2, the controller 10 obtains a file name specified as the backup target from the acquired directory path.

In S3, as will be explained later on, the controller 10 creates the file list L1 to be backed up by the NAS 1 and the file list L2 to be backed up by the NAS 2, according to performance of each of the NAS 1 and the NAS 2. The NAS 1 stores the file lists L1 and L2 on the memory 12 or in predetermined storage areas provided on the disk drives 3 and 4. These backup target file lists L1 and L2 are structured of records each consisting of pieces of data entered in a "file name" field, a "directory path" field and a "file size" field.

In S4, the controller 10 counts a file count registered in the file list L1, and sets this file count in the counter A on the shared logical disk 7. Similarly, the controller 10 counts a file count registered in the file list L2, and sets this file count in the counter B on the shared logical disk 7.

In S5, the controller 10 sends the file lists L1 and L2 created in S3 to the NAS 2. In S6, the controller 10 sends to the NAS 2 a backup start request based on the file list L2 and an address of the backup system 9 for executing the backup.

In S7, the controller 10 boots, as a new thread, the backup progress monitoring process 104 for detecting a fault on the NAS 2.

From S8 onward, the backup of the NAS 1 is started.

In S8, the controller 10 first acquires and stores present time T1 defined as backup starting time in order to measure the performance of the NAS 1.

Next, in S9, the controller 10 reads one record from the file list L1 created in S3, and acquires a file name, a directory path, and a file size of the backup target file.

Subsequently, in S10, when the file list L1 does not yet reach an End Of File (EOF), the process advances to S11. In S11, the controller 10 transfers the acquired directory path and file name to the backup system 9, and requests the backup system 9 for the backup.

In S12, the controller 10 adds the file size with its transfer finished in S11 to a predetermined area on the memory 12.

Next, in S13, the controller 10 decrements the counter A on the shared logical disk 7. Namely, the controller 10 decrements the file count of the files requested to be backed up in S11. As will be described afterward, the NAS 2 can grasp a progress stage of the backup of the NAS 1 by referencing the counter A on the shared logical disk 7, and can specify the files that should be backed up by the NAS 1 on the basis of the file lists L1 and L2 retained by the NAS 2 and the counter A.

The controller 10 executes S9 through S13 till the end of the file list L1 is reached, thereby completing the backup. Then, the process advances from S10 to S14 to acquire present time T2 when the backup has been completed.

In S15, the controller 10 obtains processing time ΔT1 expended for the backup from a difference between the backup starting time T1 acquired in S8 and the backup completion time T2 acquired in S14. At the same time, the controller 10 outputs to the shared logical disk 7 the log information LogA containing a total file size integrated in S12 and a backup completion date, thereby finishing the backup of the NAS 1. Simultaneously, the controller 10 terminates the thread (which is the backup progress monitoring process 104) booted in S7 and monitoring the NAS 2. Further, the file size stored in the predetermined area is reset, thus coming to a get-ready-for-the-next-process status.

It should be noted that the log information LogA is, as shown in, e.g., FIG. 8, file-formatted information in which a file has records each consisting of data entered in a "backup completion date" field, a "processing time ΔT1" field and a "file size" field.

<Backup Request Receiving Process 202 on NAS 2>

Figure 4:
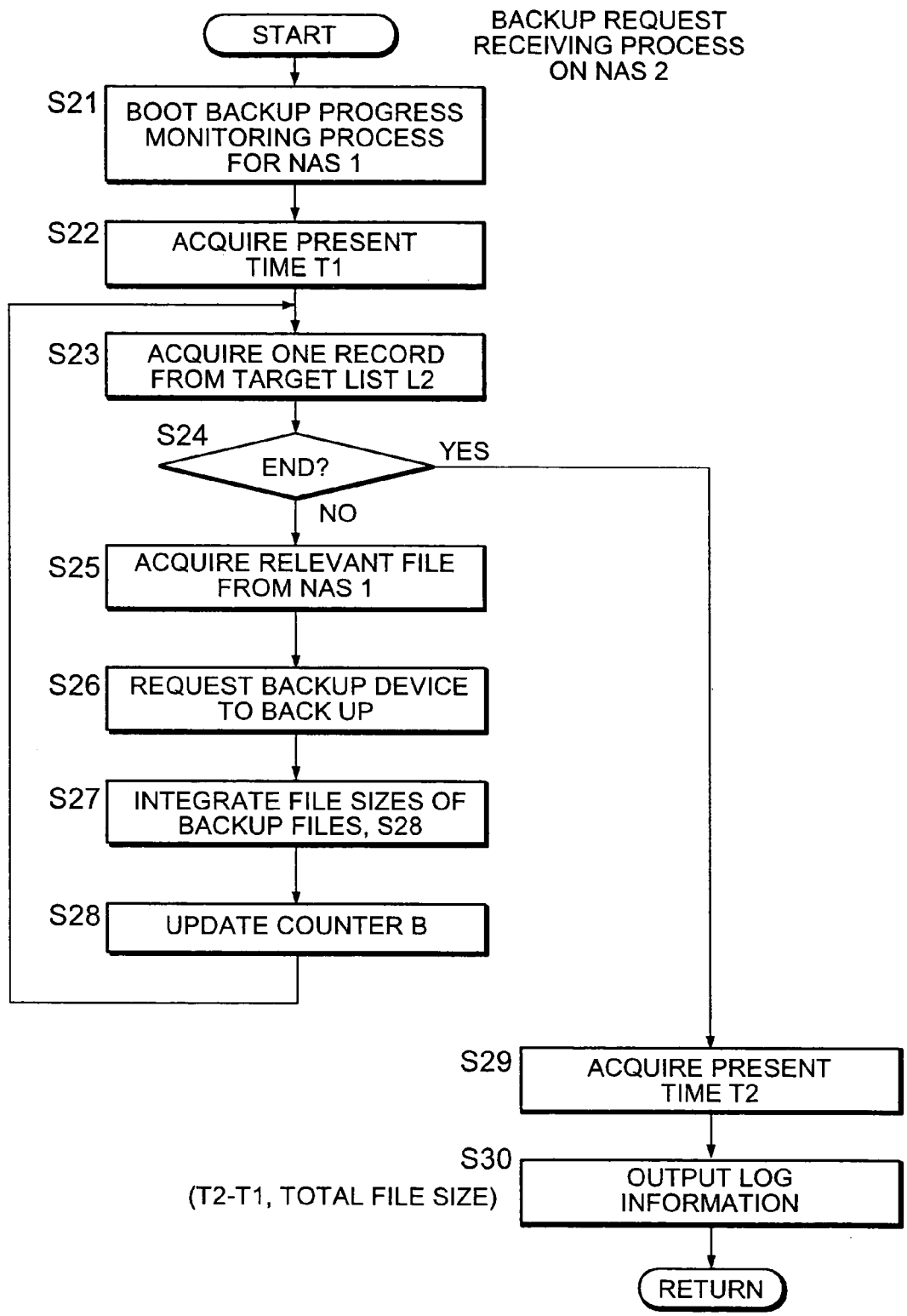
FIG. 4 is a flowchart showing an example of the backup request process executed by the controller of a NAS 2.

FIG. 4 is a flowchart showing an example of the backup request receiving process 202 executed by the controller 20 of the NAS 2. The backup request receiving process 202 is executed when the controller 20 receives the backup request from the NAS 1.

The controller 20 of the NAS 2, when receiving the file lists L1 and L2 and receiving the backup request from the controller 10 of the NAS 1, stores the file lists L1 and L2 on the memory 22 or in predetermined areas on the disks 5 and 6.

At first, in S21, the controller 20 boots, as a new thread, the backup progress monitoring process 204 (which will be described later on) for detecting a fault on the NAS 1.

Next, in S22, the controller 20 acquires and stores the present time T1 defined as the backup starting time in order to measure the performance of the NAS 2.

In S23, the controller 20 reads one record from the file list L2 received from the NAS 1, and acquires a file name, a directory path and a file size of the backup target file.

Subsequently, in S24, when the file list L2 does not yet reach an End Of File (EOF), the process advances to S25 to read the backup target file from the disk drive 3 of the NAS 1 on the basis of the file name and the directory path that have been acquired in S23.

In S26, the controller 20 transfers the read-out file to the backup system 9 and requests the backup system 9 for the backup.

In S27, the controller 20 adds the file size with its transfer finished in S26 to a predetermined area on the memory 22.

Next, In S28, the controller 20 decrements the counter B on the shared logical disk 7. Namely, the controller 20 decrements the file count of the files requested to be backed up in S26. As will be described afterward, the NAS 1 can grasp a progress stage of the backup of the NAS 2 by referencing the counter B on the shared logical disk 7, and can specify the files that should be backed up by the NAS 2 on the basis of the file lists L1 and L2 retained by the NAS 1 and the counter B.

The controller 20 executes S23 through S28 till the end of the file list L2 is reached, thereby completing the backup. Then, the process advances from S24 to S29 to acquire present time T2 when the backup has been completed.

In S30, the controller 20 obtains processing time ΔT2 expended for the backup from a difference between the backup starting time T1 acquired in S22 and the backup completion time T2 acquired in S29. At the same time, the controller 20 outputs to the shared logical disk 7 the log information LogB containing a total file size integrated in S27 and a backup completion date, thereby finishing the backup of the NAS 2. Simultaneously, the controller 20 terminates the thread (which is the backup progress monitoring process 204) booted in S21 and monitoring the NAS 1. Further, the file size stored in the predetermined area is reset, thus coming to a get-ready-for-the-next-process status.

It should be noted that, similarly to the log information LogA, the log information LogB is, as shown in, e.g., FIG. 8, file-formatted information in which a file has records each consisting of data entered in a "backup completion date" field, a "processing time ΔT2" field and a "file size" field.

<Backup Target List Output Process>

Next, the backup target list output process executed in S3 in FIG. 3 will be explained with reference to a subroutine in FIG. 5.

In S41, the controller 10 of the NAS 1 acquires pieces of log information LogA and LogB of the last time from the shared logical disk 7.

In S42, the controller 10 calculates a backup speed (MB/sec or GB/min) per unit time from the processing time ΔT1 and the processing time ΔT2 that are expended for the backups by the NAS 1 and the NAS 2 and from the total file size on the basis of the log information LogA and LogB. Then, the controller 10 outputs the backup speed of the NAS 1 as V1 and outputs the backup speed of the NAS 2 as V2.

Next, in S43, the controller 10 calculates, based on the backup speeds V1 and V2 of the NAS 1 and the NAS 2, a proportional dividing ratio r1 of the file size of the files that are backed up by the NAS 1 such as:

Proportional dividing ratio $r1=V1/(V1+V2)$

Subsequently, in S44, the controller 10 calculates a proportional dividing ratio r2 of the file size of the files that are backed up by the NAS 2 such as:

$r2=1-r1$ or from

Proportional dividing ratio $r1=V1/(V1+V2)$

In S45, the controller 10 acquires the directory path or the file of the backup request received from the management client computer 8. The controller 10 searches for all the files under the directory path of the disk drive 3, and calculates a total file size (capacity) of the files to be backed up on the basis of the file sizes of the respective files.

In S46, the controller 10 sorts out the file lists acquired based on the backup target directory path in the sequence of the file size from the largest down to the smallest, and creates a temporary file list Lt in S47. Herein, the temporary file list Lt becomes as shown in FIG. 9a.

Next, in S48, the controller 10 extracts the files out of the created temporary file list Lt from the high-order in size (capacity) till the proportional dividing ratio r1 of (the total size X NAS 1) is reached. In S49, the controller 10 creates, as shown in FIG. 9b, the file list L1 as the backup target of the NAS 1 by use of the extracted file names and file sizes.

Subsequently, in S50, the controller 10 creates, as shown in FIG. 9 (C), the file list L2 as the backup target of the NAS 2 by subtracting the files extracted in S48 from the temporary file list Lt.

Through the above-described subroutine, the controller 10 calculates pieces of performance information (backup speeds) of the NAS 1 and the NAS 2 from the log information (the backup processing time, the backup capacity) in the backup process of the last time, and proportionally divides the backup target files by use of the thus-calculated performance information so as to equalize the backup processing time of the NAS 1 with the backup processing time of the NAS 2, thereby preventing an extreme time distance between the time required for the backup by the NAS 1 and the time required for the backup by the NAS 2, and making it possible to set the backup capacities allocated to the NAS 1 and the NAS 2 so as to reduce the entire backup time. It should be noted that the plural NASs execute the backups in parallel according to the present invention, and hence the entire backup time results in the longest NAS processing time.

Further, the proportional dividing ratio corresponding to states (such as a state of occurrence of fragmentation, etc.) of the disk drives of the respective NASs can be determined by acquiring the performance information of the immediate NASs, whereby the entire backup time can be minimized.

<Backup Progress Monitoring Process 104 on NAS 1>

The backup progress monitoring process about the NAS 2, which is booted in S7 in FIG. 3, will be explained in detail with reference to a flowchart in FIG. 6.

To begin with, in S51, the controller 10 reads a value of the counter B from the shared logical disk 7 and sets this value in a parameter CNT1, thus acquiring a remaining file count of the files that should be backed up by the NAS 2.

Next, in S52, present time for monitoring a change in the counter B is acquired as Time1.

In S53, the controller 10 reads a value of the counter B from the shared logical disk 7 and sets this value in a parameter CNT2, and acquires the present time as Time2 in S54.

In S55, the controller 10 judges whether the value of the parameter CNT2 that has been set in S53 is 0 or not. When the value is 0, the counter B on the NAS 2 comes to 0, and the should-be-backed-up file count is 0. Hence, the process advances to S61 to judge that the backup of the NAS 2 has been completed, thereby terminating the process.

While on the other hand, when the value of the parameter CNT2 is not 0, the process advances to S56 to judge whether the value of the parameter CNT1 is the same as the value of the parameter CNT2 or not. If not the same value, the counter B is decremented according as the backup of the NAS 2 progresses, and hence the controller 10 judges that the NAS 2 normally operates and the process returns to S51.

While on the other hand, when the parameter CNT1 is equal to the parameter CNT2, there is a possibility in which the backup of the NAS 2 might show no progress, and therefore the process advances to S57. In S57, the controller 10 obtains a difference Time3 between the time Time2 acquired in S54 and the time Time1 acquired in S51, and judges in S58 whether or not the difference Time3 exceeds preset time Tdown.

If it is judged in S58 that the difference Time3 does not exceed the preset time Tdown, a possibility is that the NAS 2 normally performs an operation (such as being heavy of process). Hence, the process returns to S53 to acquire the value of the counter B and the time Time2 again.

On the other hand, if it is judged in S58 that the counter B shows no change in value and that the time difference Time3 exceeds the preset time Tdown, the process advances to S59 to judge that a fault occurs on the NAS 2.

Then, the process advances to S60 to set so that the NAS 1 surrogated for the NAS 2 backs up the contents of the file list L2 from the value of the counter B, thereby terminating the process. It should be noted that a scheme of this setting may be such that a flag or the like is set beforehand and is checked just when terminating the backup request receiving process in FIG. 3, and, when the flag is ON, the backup of the file list L2 retained on the controller 10 may resume from the value of the counter B.

Figure 6:
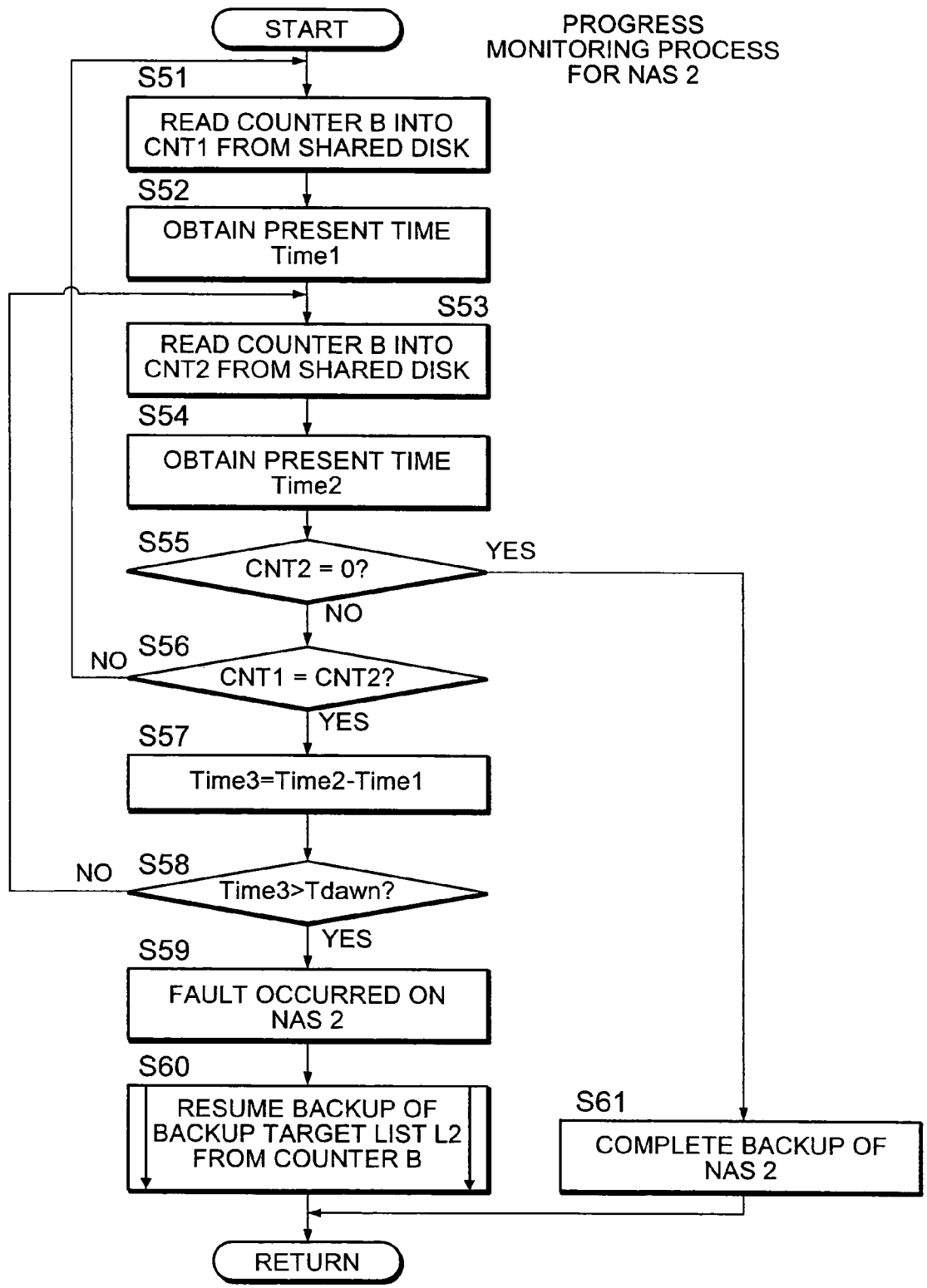
FIG. 6 is a flowchart showing an example of a progress monitoring process on the NAS 2 that is executed by the controller of the NAS 1.

Through the process in FIG. 6, the controller 10 of the NAS 1 can detect the occurrence of the fault till the backup of the NAS 2 is completed in a way of monitoring the change in the counter B on the shared logical disk 7. Then, when the backup target files exist on the disk drive 3 under the control of the NAS 1, the NAS 1 can, even if the fault occurs on the NAS 2, back up the contents on the disk drive 3 under the control of the NAS 1 itself without waiting for the failover of the NAS 2.

<Backup Progress Monitoring Process 204 on NAS 2>

The backup progress monitoring process about the NAS 1, which is booted in S21 in FIG. 4, will be explained in detail with reference to a flowchart in FIG. 7.

To begin with, in S71, the controller 20 reads a value of the counter A from the shared logical disk 7 and sets this value in a parameter CNT1, thus acquiring a remaining file count of the files that should be backed up by the NAS 1.

Next, in S72, present time for monitoring a change in the counter A is acquired as Time1.

In S73, the controller 20 reads a value of the counter A from the shared logical disk 7 and sets this value in a parameter CNT2, and acquires the present time as Time2 in S74.

In S75, the controller 20 judges whether the value of the parameter CNT2 that has been set in S73 is 0 or not. When the value is 0, the counter A on the NAS 1 comes to 0, and the should-be-backed-up file count is 0. Hence, the process advances to S82 to judge that the backup of the NAS 1 has been completed, thereby terminating the process.

While on the other hand, when the value of the parameter CNT2 is not 0, the process advances to S76 to judge whether the value of the parameter CNT1 is the same as the value of the parameter CNT2 or not. If not the same value, the counter A is decremented according as the backup of the NAS 1 progresses, and hence the controller 20 judges that the NAS 1 normally operates and the process returns to S71.

While on the other hand, when the parameter CNT1 is equal to the parameter CNT2, there is a possibility in which the backup of the NAS 1 might show no progress, and therefore the process advances to S77. In S77, the controller 20 obtains a difference Time3 between the time Time2 acquired in S74 and the time Time1 acquired in S71, and judges in S78 whether or not the difference Time3 exceeds preset time Tdown.

If it is judged in S78 that the difference Time3 does not exceed the preset time Tdown, a possibility is that the NAS 1 normally performs an operation (such as being heavy of process). Hence, the process returns to S73 to acquire the value of the counter A and the time Time2 again.

On the other hand, if it is judged in S78 that the counter A shows no change in value and that the time difference Time3 exceeds the preset time Tdown, the process advances to S79 to judge that a fault occurs on the NAS 1.

Then, the process advances to S80 to monitor that the failover process on the NAS 1 is terminated. After completion of this failover process, the process advances to S81.

The NAS 2 serving as a client to the NAS 1 accesses the disk drive 3 of the NAS 1 and is therefore unable to mount the disk drive 3 onto the NAS 2 till the failover process on the NAS 1 is terminated. For this reason, there is a necessity of waiting for the termination of the failover process on the NAS 1. It should be noted that the monitoring of the failover process is done in such a way that the controller 20 queries the NAS 1 by detecting the heartbeats as explained above or detects whether the failover process on the NAS 1 is completed or not by referencing the log information.

In S81, the controller 20 mounts the disk drive 3 of the NAS 1 onto the NAS 2, and at the same time sets so that the NAS 2 surrogated for the NAS 1 backs up the contents of the file list L1 from the value of the counter A, thereby terminating the process. Note that a scheme of this setting may be such that a flag or the like is set beforehand and is checked just when terminating the backup request receiving process in FIG. 4, and, when the flag is ON, the backup of the file list L1 of the NAS 1 retained on the controller 20 may resume from the value of the counter A.

Figure 7:
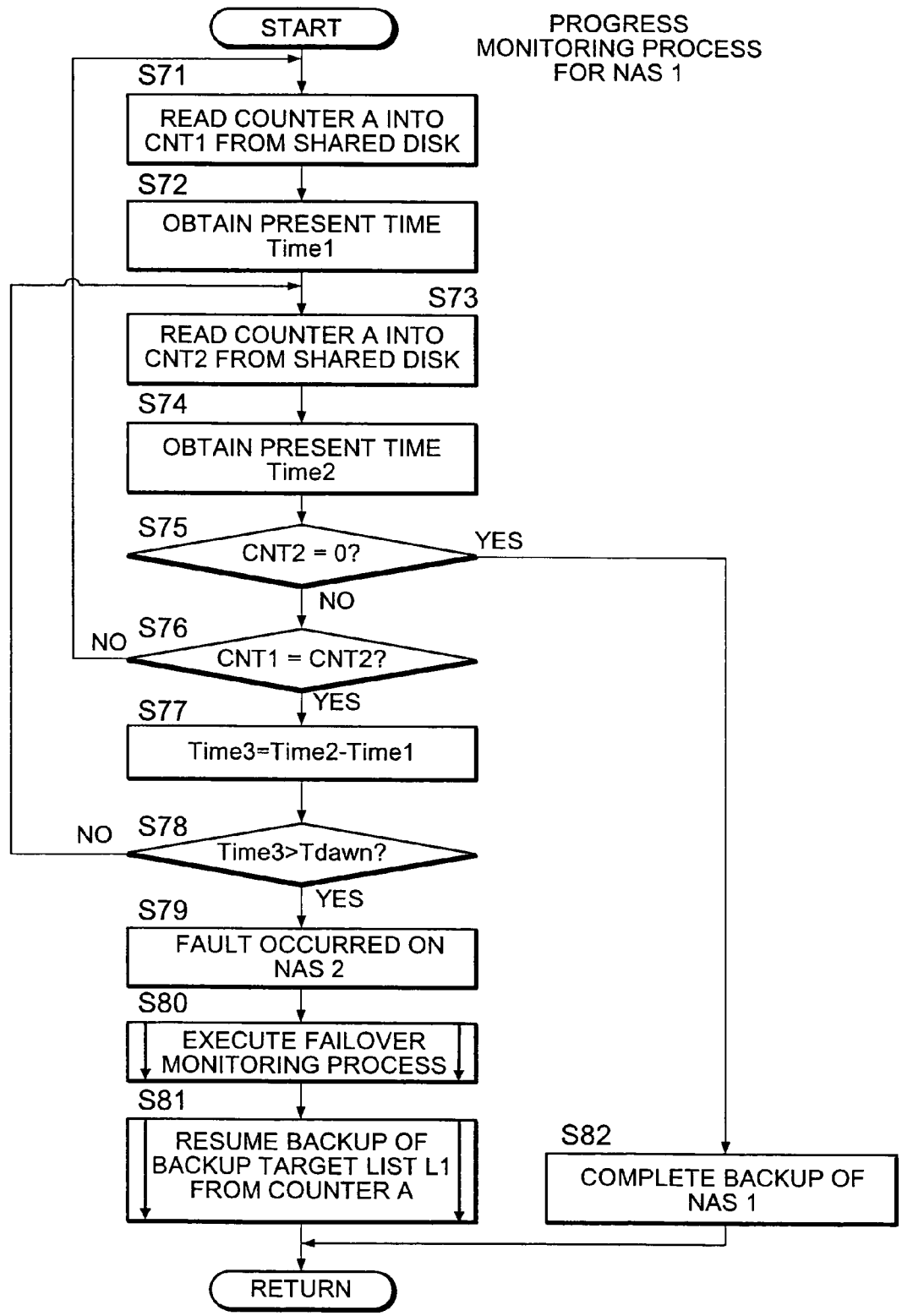
FIG. 7 is a flowchart showing an example of the progress monitoring process on the NAS 1 that is executed by the controller of the NAS 2.

Through the process in FIG. 7, the controller 20 of the NAS 2 keeps monitoring till the backup of the NAS 1 is completed, and, when the preset time Tdown elapses with no change in the counter B on the shared logical disk 7, judges that the fault occurs on the NAS 1. Then, the NAS 2 surrogated for the NAS 1 can continue to backup the file list L1.

Figure 10:
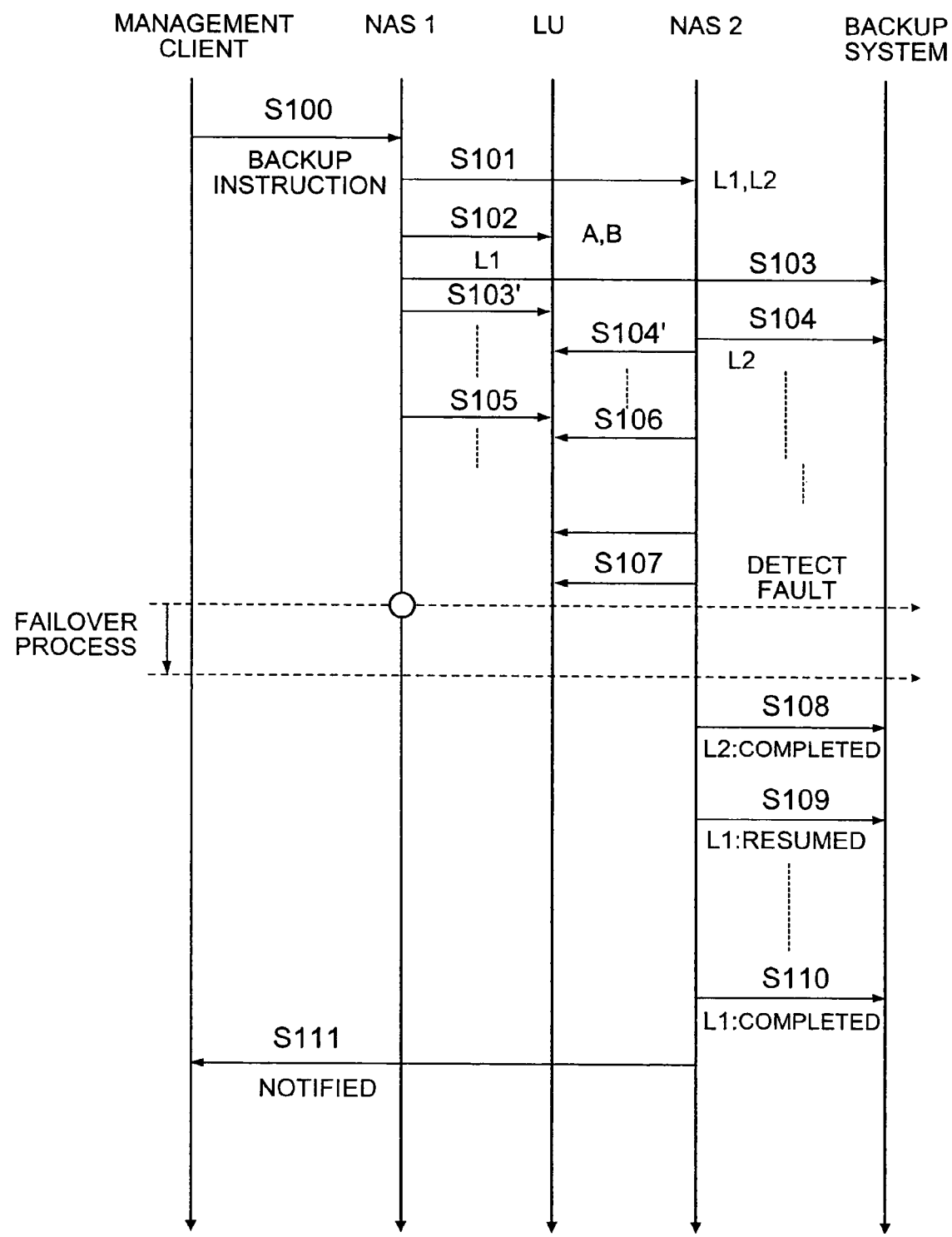
FIG. 10 is a time chart showing parallel backups and a take-over process when a fault occurs on the NAS 1.

The whole parallel backup operations of the NAS 1 and the NAS 2 will be discussed with reference to FIG. 10.

When the management client computer 8 gives the backup request to a NAS cluster 100, the NAS 1 serving as a host of the NAS cluster 100 receives this request (S100).

Figure 5:
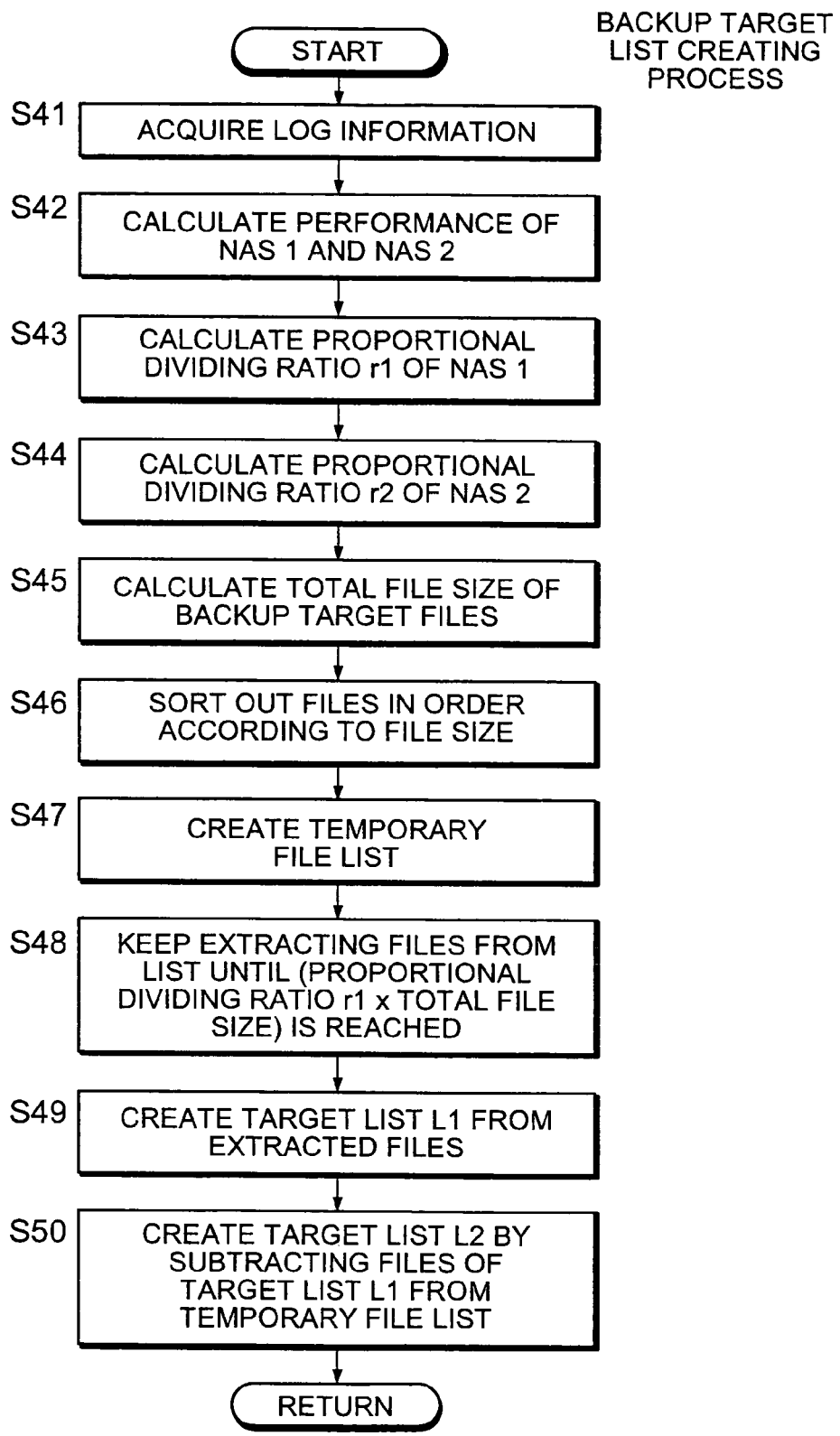
FIG. 5 is a flowchart showing a subroutine of a backup target list creating process executed by the backup request process on the NAS 1.

The NAS 1 creates, in the steps shown in FIG. 5, the file list L1 to be backed up by the NAS 1 and the file list L2 to be backed up by the NAS 2, corresponding to the performance of each of the NAS 1 and the NAS 2, and sends these lists to the NAS 2 as well (S101). Then, the counters A and B corresponding to the file counts of the file lists L1 and L2 are set on the shared logical disk 7 (S102).

The NAS 1 does the backup onto the backup system 9 according to the file list L1 (S103), and decrements the file count of the backed-up files sequentially from the counter A (S103'). Hereafter, the NAS 1 performs the backup by repeating S103 and S103'.

The NAS 2 does the backup onto the backup system 9 according to the file list L2 (S104), and decrements the file count of the backed-up files sequentially from the counter B (S104'). Hereafter, the NAS 2 performs the backup by repeating S104 and S104'.

Accordingly, the files of the backup target disk drive 3 are backed up in parallel by the two storage systems such as the NAS 1 and the NAS 2, and hence the backup can be executed extremely fast.

In the meantime, the NAS 1 references the counter B on the shared logical disk 7 and thus detects a fault on the NAS 2 (S105). Similarly, the NAS 2 references the counter A on the shared logical disk 7 and thus detects a fault on the NAS 1 (S106).

Herein, when the NAS detects the fault on the NAS 1 (S107), the NAS 2 takes over the backup operation of the NAS 1 after waiting for the completion of the failover process.

To be specific, upon the completion of the backup process of the file list L2 designated in S101 (S108), the NAS 2 mounts the disk drive 3 of the NAS 1 and resumes the backup of the files of the file list L1 from the file corresponding to the value of the counter A (S109). Thus, when the fault occurs on the NAS 1, the NAS 2 can take over the backup process of the NAS 1 after the failover process. Upon the completion of this backup process (S110), the NAS 2 surrogated for the NAS 1 notifies the management client computer 8 that the backup has been completed (S111). It should be noted that this notification may contain information showing the occurrence of the fault on the NAS 1.

As described above, according to the present invention, the contents of the disk drive 3 of the NAS 1 are backed up in parallel by the NAS 1 and the NAS 2, thereby enabling the higher-speed backup process than the backup by the single NAS 1. Then, even if the fault occurs on any one of these NASs, it is possible to surely detect the fault occurring on one NAS by referencing both the counters A and B on the shared logical disk 7.

Then, both the NAS 1 and the NAS 2 retain the file lists L1 and L2 necessary for the backup, and the executed results are written to the counters on the shared logical drive 7. Therefore, even if the fault occurs on one NAS, the other NAS can surely take over the backup operation, whereby the backup speed can be remarkably improved while ensuring the reliability.

Further, the backup target file allocation to the NAS 1 and the NAS 2 is determined based on the performance (the backup speed) of each of the NAS 1 and the NAS 2. It is therefore feasible to substantially equalize the periods of time expended for the backups by the two NASs, and consequently the entire backup time can be minimized.

<Second Embodiment>

Figure 11:
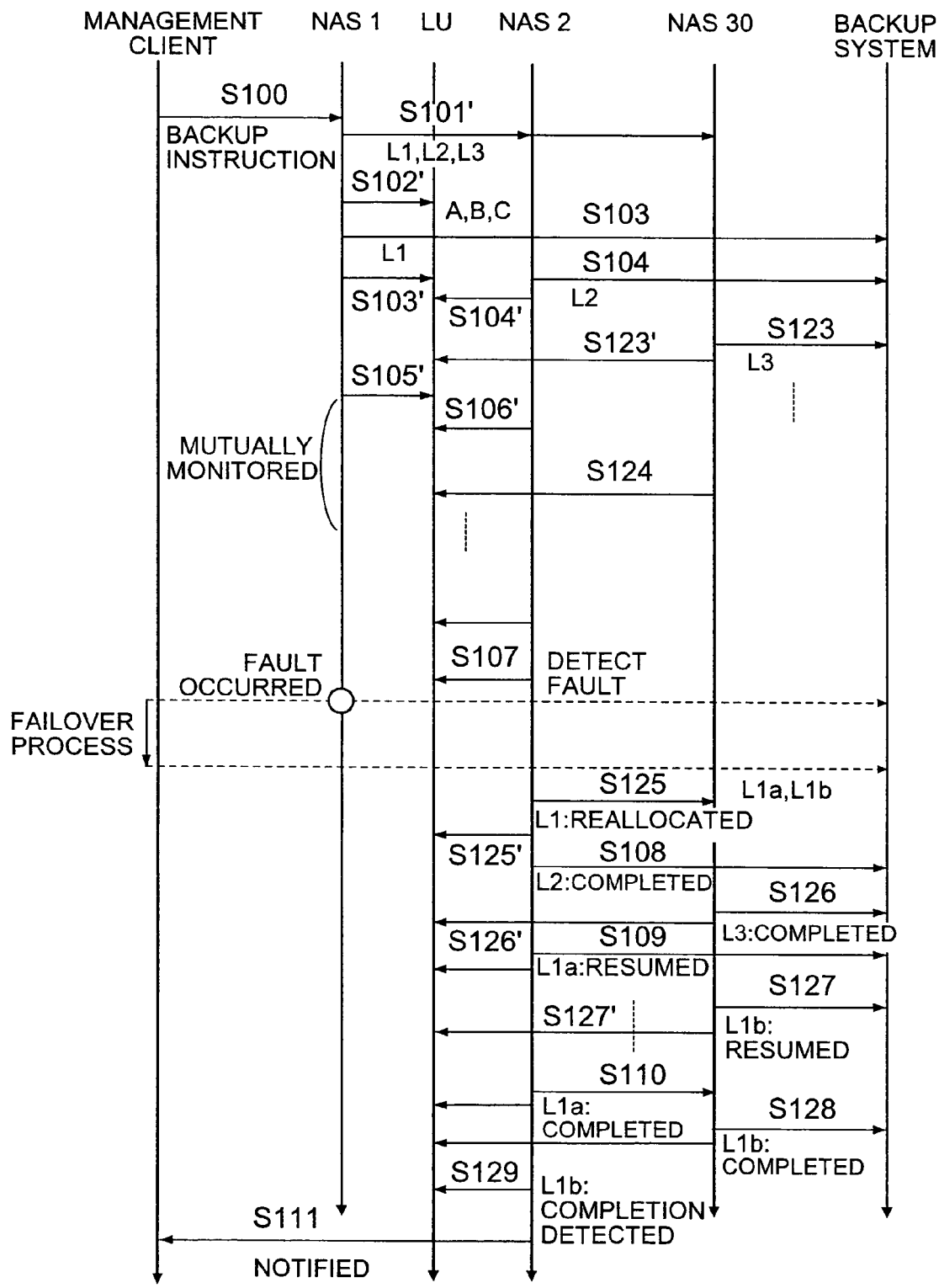
FIG. 11 is a time chart illustrating a second embodiment and showing the parallel backups by three pieces of NASs and the take-over process when the fault occurs on the NAS 1.

FIG. 11 illustrates a second embodiment, and shows a time chart in a case where the NAS cluster 100 in the first embodiment is constructed of three pieces of NAS 1, NAS 2, and NAS 30.

An architecture of the NAS 30 is the same as the NAS 2, and the shared logical disk 7 is stored with, as in the first embodiment, a counter C and log information LogC of the NAS 30.

The NAS 1, upon receiving the backup request from the management client computer 8, reads pieces of log information LogA, LogB, and LogC on the shared logical disk 7. Then, the NAS 1 creates backup speed file lists L1, L2, and L3 corresponding to the performance of each of the NAS 1, the NAS 2, and the NAS 30, and allocates these file lists to the NAS 2 and the NAS 30 (S101'). Along with this, the NAS 1 sets the counters A through C on the shared logical disk 7, corresponding to the file counts of the file lists L1, L2, and L3 (S102').

The NAS 1 does the backup onto the backup system 9 according to the file list L1 (S103), and decrements the file count of the backed-up files sequentially from the counter A (S103'). Hereafter, the NAS 1 performs the backup by repeating S103 and S103'.

The NAS 2 does the backup onto the backup system 9 according to the file list L2 (S104), and decrements the file count of the backed-up files sequentially from the counter B (S104'). Hereafter, the NAS 2 performs the backup by repeating S104 and S104'.

The NAS 30 does the backup onto the backup system 9 according to the file list L3 (S123), and decrements the file count of the backed-up files sequentially from the counter C (S123'). Hereafter, the NAS 30 performs the backup by repeating S123 and S123'.

Accordingly, the files of the backup target disk drive 3 are backed up in parallel by the three storage systems such as the NAS 1, the NAS 2, and the NAS 30, and hence the backup can be executed even faster.

In the meantime, the NAS 1 references the counters B and C on the shared logical disk 7 and thus detects a fault on the NAS 2 and the NAS 30 (S105'). Similarly, the NAS 2 references the counters A and C on the shared logical disk 7 and thus detects a fault on the NAS 1 and the NAS 30 (S106'). Similarly, the NAS 30 references the counters A and B on the shared logical disk 7 and thus detects a fault on the NAS 1 and the NAS 2 (S124).

Here at, if the NAS 2 detects the fault on the NAS 1 (S107), the NAS 2 takes over the backup operation of the NAS 1 after waiting for the completion of the failover process. An assumption herein is that the NAS 2 replacing the NAS 1 becomes a host, and the NAS 30 is changed to a client of the NAS 2.

At this time, the NAS 2 and the NAS 30 take over the backup operation of the NAS 1 on which the fault occurred, and hence the NAS 2 reallocates, based on the counter A and the file list L1, the remaining file list Ll corresponding to the performance of each of the NAS 2 and the NAS 30 through the same process as shown in FIG. 5. Then, the NAS 2 creates a file list L1a as a process of the NAS 2 and a file list L1b as a process of the NAS 30, and distributes these new file lists L1a and L1b to the NAS 30 (S125). At this time, counters A1 and A2 corresponding to the new file lists L1a and L1b are set on the shared logical disk 7, and the NAS 2 and the NAS 30 detect a fault during the backup process of the file lists L1a and L1b through the new counters (S125').

Namely, the NAS 2, upon completion of the backup process of the file list L2 designated in S101 (S108), resumes the file backup from the files of the file list L1a (S109).

Similarly, the NAS 30, upon completion of the backup process of the file list L3 designated in S101 (S126), resumes the file backup from the files of the file list L1*b* (S127).

This process also proceeds in the same way as the above-mentioned, wherein each time the backup request is given to the backup system 9, the NAS 2 decrements the counter A1 on an every-file-count basis of the backed-up files, and the NAS 30 decrements the counter A2 on the every-file-count basis of the backed-up files.

During a period for which the backup process of the remaining files of the NAS 1 is executed, the NAS 2 references the counter A2 on the shared logical disk 7 and thus monitors the fault on the NAS 30 (S125'), while the NAS 30 references the counter A1 on the shared logical disk 7 and thus monitors the fault on the NAS 2 (S126').

In S110, the NAS 2 completes the backup of the file list L1*a* and decrements the counter A1 down to 0. Similarly, in S128, the NAS 30 completes the backup of the file list L1*b* and decrements the counter A2 down to 0.

The NAS 2 monitors the counter A2 and, the counter A2 being decremented down to 0, detects that the backup of the NAS 30 is completed (S129). Then, the NAS 2 surrogated for the NAS 1 notifies the management client computer 8 that the backup has been completed (S111).

Thus, the files of the disk drive 3 of one NAS are backed up in parallel by the multiple NASs, whereby the whole backup speed can be remarkably improved. In addition, the respective NASs mutually reference the counters on the shared logical drive 7 and thus detect the faults each other. If the fault occurs, the remaining files thereof are reallocated. Even if the fault occurs on one NAS, it is possible to execute the higher-speed backup than the backup by the single NAS.

As described above, the architecture that the NAS cluster 100 is constructed of the multiple NASs enables the parallel backups by the remaining plural NASs even if the fault occurs on one NAS. It is therefore feasible to improve the speed and to ensure the reliability at the same time.

<Modified Examples>

In each of the embodiments discussed above, the backup system 9 is constructed of the random-accessible optical disk drive, thereby making it possible to respond to the write requests from the plural NASs and to improve the backup speed as compared with the drive involving the sequential storage such as a tape drive.

In the embodiments discussed above, when the backup target files requested by the management client computer 8 are allocated to the NAS 1 and the NAS 2, the files are sorted out in the sequence of the file size from the largest down to the smallest and extracted into the file list L1 that should be backed up by the NAS 1 till it reaches the (proportional dividing ratio r1 X total file size). The files may, however, be allocated alternately to the NAS 1 and the NAS 2 from the high-order in capacity (size) of the temporary file list Lt. Alternatively, when three pieces of NASs are provided, the files may also be allocated to the NAS 1, the NAS 2, and the NAS 30 in this sequence.

Further, in the respective embodiments discussed above, the file systems are built up on the shared logical disk 7, and the counters A through C and pieces of log information LogA through LogC may be stored as files and may also be stored in predetermined blocks enabling a block-by-block access.

Moreover, each of the embodiments discussed above has exemplified the periodic accesses to the counters A through C when monitoring the occurrences of the faults each other, however, backup completion schedule time may be presumed from the backup speed of each NAS and from the total file size of the backup target files, and the counters A through C may also be referenced at this presumed time. In this case, a processing load of each NAS can be reduced by preventing the plural NASs from frequently accessing the shared logical disk 7, and the backup speed can be improved corresponding to how much the load is reduced.

Still further, in the respective embodiments discussed above, the backup speed (the performance information) of each NAS is obtained based on the log information LogA through LogC of the last time. Based on the performance of each disk drive connected to the NAS and on the processing speed of the controller, however, the performance information of each NAS is preset, and the backup target files may also be proportionally divided based on the performance information.

Yet further, each of the embodiments discussed above has exemplified an example in which the respective NASs retain the file lists L1 and L2 specifying the should-be-backed-up files, however, these file lists L1 and L2 may also be stored on the shared logical disk 7, and each NAS may read the relevant file list from the shared logical disk 7.

While the present invention has been described in detail and pictorially in the accompanying drawings, the present invention is not limited to such detail but covers various obvious modifications and equivalent arrangements, which fall within the purview of the appended claims.

What is claimed is:

1. A backup method for requesting a backup system to back up files stored on a predetermined NAS of plural NASs in response to a backup request given from a client computer, comprising:

selecting backup target files based on the backup request given from the client computer;

allocating the selected backup target files respectively to the plural NASs:

causing the respective NASs to request the backup system to back up the allocated backup target files in parallel;

detecting an occurrence of a fault by monitoring the plural NASs from each other;

taking over, when detecting that the fault has occurred, to another NAS the backup target files at or after a point of time when the fault occurred from within the backup target files of a fault-occurred NAS on which the fault occurred;

causing the other NAS to request the backup system to back up the backup target files taken over;

wherein the detecting the occurrence of the fault by monitoring the plural NASs from each other, comprises:

setting counters associated respectively with the NASs;

updating the counter corresponding to a file count of the files for which the backup request has been made, every time the backup request is given to the backup system;

detecting a change in value of the counter; and judging, when there is no change in the counter value after a predetermined time has elapsed, that the fault has occurred on the NAS associated with the counter.

2. The backup method according to claim 1, wherein the allocating the backup target files respectively to the plural NASs comprises: allocating the selected backup target files to the respective NASs to equalize periods of time from start of backups of the respective NASs to completion of the backups.

3. The backup method according to claim 1, wherein the allocating the backup target files respectively to the plural NASs comprises: acquiring pieces of performance information of the NASs; determining a proportional dividing ratio among the respective NASs based on the acquired performance information; and allocating the backup target files of the NASs according to the proportional dividing ratio from within the selected backup target files.

4. The backup method according to claim 1, comprising, configuring the plural NASs as a NAS cluster; creating a file list in which the selected backup target files are allocated respectively to the plural NASs; and notifying all the NASs within the NAS cluster of the file lists of the respective NASs, wherein taking over to another NAS the backup target files of the fault-occurred NAS, comprises sending the file list of the fault-occurred NAS to the other NAS and causing the other NAS to back up the file list.

5. The backup method according to claim 4, comprising: acquiring, when there are the plural NASs taking over the backup target files of the fault-occurred NAS, the performance information of the NASs; determining a proportional dividing ratio among the respective NASs excluding the fault-occurred NAS based on the performance information; creating a new file list, allocated to each of the NASs, of the files at or after a point of time when the fault occurred from the file list of the backup target files of the fault-occurred NAS according to the proportional dividing ratio; and sending a new file list to each of the NASs excluding the fault-occurred NAS.

6. A backup method for requesting a backup system to back up files stored on a predetermined NAS or plural NASs in response to a backup request given from a client computer, comprising:
    selecting backup target files based on the backup request given from the client computer;
    allocating the selected backup target files respectively to the plural NASs;
    causing the respective NASs to request the backup system to back up the allocated backup target files in parallel;
    detecting an occurrence of a fault by monitoring the plural NASs from each other,
    taking over, when detecting that the fault has occurred, to another NAS the backup target files at or after a point of time when the fault occurred from within the backup target files of a fault-occurred NAS on which the fault occurred;
    causing the other NAS to request the backup system to back up the backup target files taken over;
    wherein the detecting the occurrence of the fault by monitoring the plural NASs from each other, comprises:
    setting counters associated respectively with the NASs;
    updating the counter corresponding to a file count of the files for which the backup request has been made, every time the backup request is given to the backup system;
    detecting a change in value of the counter;
    judging, when there is no change in the counter value after a predetermined time has elapsed, that the fault has occurred on the NAS associated with the counter; and
    wherein the counters are set in a shared area that can be subjected to one of a reference and update performed by each of the plural NASs.

7. The backup method according to claim 6, wherein the allocating the backup target files respectively to the plural NASs comprises:
    allocating the selected backup target files to the respective NASs to equalize periods of time from start of backups of the respective NASs to completion of the backups.

8. The backup method according to claim 6, wherein the allocating the backup target files respectively to the plural NASs comprises:
    acquiring pieces of performance information of the NASs; determining a proportional dividing ratio among the respective NASs based on the acquired performance information; and allocating the backup target files of the NASs according to the proportional dividing ratio from within the selected backup target files.

9. The backup method according to claim 6, comprising, configuring the plural NASs as a NAS cluster; creating a file list in which the selected backup target files are allocated respectively to the plural NASs; and notifying all the NASs within the NAS cluster of the file lists of the respective NASs, wherein taking over to another NAS the backup target files of the fault-occurred NAS, comprises sending the file list of the fault-occurred NAS to the other NAS and causing the other NAS to back up the file list.

10. The backup method according to claim 9, comprising: acquiring, when there are the plural NASs taking over the backup target files of the fault-occurred NAS, the performance information of the NASs; determining a proportional dividing ratio among the respective NASs excluding the fault-occurred NAS based on the performance information; creating a new file list, allocated to each of the NASs, of the files at or after a point of time when the fault occurred from the file list of the backup target files of the fault-occurred NAS according to the proportional dividing ratio; and sending a new file list to each of the NASs excluding the fault-occurred NAS.

11. A control system of a NAS, comprising:
    plural NASs stored with files;
    a backup request receiving unit that receives a backup request from a client computer;
    a backup target selected unit that selects files from the NASs in response to the backup request;
    a backup execution unit that requests a backup system to back up the selected files;
    a backup target dividing unit that allocates the selected backup target files respectively to the plural NASs;
    a backup command unit that makes the respective NASs instruct the backup systems to back up the allocated files in parallel;
    a fault occurrence detection unit that detects an occurrence of a fault by monitoring the plural NASs from each other;
    a surrogate backup unit that takes over, when detecting that the fault has occurred, to another NAS the backup target files at or after a point of time when the fault occurred from within the backup target files of a fault-occurred NAS on which the fault occurred;
    wherein the fault occurrence detection unit comprises: a counter that is set in each of the NASs and updates a file count of the files of which the backup is requested on a NAS-by-NAS basis; and a counter value detection unit that detects a change in value of the counter; and the fault occurrence detection unit judges, when there is no change in the counter value after a predetermined time has elapsed, that the fault has occurred on the NAS associated with the counter.

12. The control system of the NAS according to claim 11, wherein the backup target dividing unit allocates the selected backup target files to the respective NASs to equalize periods of time from start of backups of the respective NASs to completion of the backups.

13. The control system of a NAS according to claim 11, wherein: the backup target dividing unit comprises: a performance information acquiring unit that acquires pieces of performance information of the NASs; and a proportional dividing ratio determining unit that determines a proportional dividing ratio of the files allocated to the respective NASs based on the acquired performance information; and the backup target dividing unit allocates the backup target files of the NASs according to the proportional dividing ratio from within the selected backup target files.

14. The control system of a NAS according to claim 11, wherein the plural NASs are configured as a NAS cluster; and the surrogate backup unit comprises: a file list creating unit that creates, when starting the backup, a file list in which the selected backup target files are allocated respectively to the plural NASs; a notifying unit that notifies all the NASs within the NAS cluster of the file lists of the respective NASs; and a backup continuing unit that continues the backup by the other NAS based on the file list at or after a point of time when the fault occurred.

15. The control system of a NAS according to claim 11, wherein the surrogate backup unit comprises: a reallocation proportional dividing ratio determining unit that acquires the performance information of the NASs taking over the backup and determines a proportional dividing ratio among the respective NASs excluding the fault-occurred NAS based on the perfomance information; a reallocation list creating unit that creates a new file list, allocated to each of the NASs, of the files at or after a point of time when the fault occurred from the file list of the backup target files of the fault-occurred NAS according to the proportional dividing ratio; and a reallocation list notifying unit that sends the new file list to each of the NASs excluding the fault-occurred NAS.

16. A control system of a NAS, comprising:
plural NASs stored with files;
a backup request receiving unit that receives a backup request from a client computer;
a backup target selected unit that selects files from the NASs in response to the backup request;
a backup execution unit that requests a backup system to back up the selected files;
a backup target dividing unit that allocates the selected backup target files respectively to the plural NASs;
a backup command unit that makes the respective NASs instruct the backup system to back up the allocated files in parallel;
a fault occurrence detection unit that detects an occurrence of a fault by monitoring the plural NASs from each other;
a surrogate backup unit that takes over, when detecting that the fault has occurred, to another NAS the backup target files at or after a point of time when the fault occurred from within the backup target files of a fault-occurred NAS on which the fault occurred;
wherein the fault occurrence detection unit comprises: a counter that is set in each of the NASs and updates a file count of the files of which the backup is requestd on a NAS-by-NAS basis; a counter value detection unit that detects a change in value of the counter; and the fault occurrence detection unit judges, when there is no change in the counter value after a predetermined time has elapsed, that the fault has occurred on the NAS associated with the counter; and wherein a shared area that can be subjected to one of reference and update performed by each of the plural NASs, is set in any one of the plural NASs; and the counter is set in the shared area.

17. The control system of the NAS according to claim 16, wherein the backup target dividing unit allocates the selected backup target files to the respective NASs to equalize periods of time from start of backups of the respective NASs to completion of the backups.

18. The control system of a NAS according to claim 16, wherein: the backup target dividing unit comprises: a performance information acquiring unit that acquires pieces of performance information of the NASs; and a proportional dividing ratio determining unit that determines a proportional dividing ratio of the files allocated to the respective NASs based on the acquired performance information; and the backup target dividing unit allocates the backup target files of the NASs according to the proportional dividing ratio from within the selected backup target files.

19. The control system of a NAS according to claim 16, wherein the plural NASs are configured as a NAS cluster; and the surrogate backup unit comprises: a file list creating unit that creates, when starting the backup, a file list in which the selected backup target files are allocated respectively to the plural NASs; a notifying unit that notifies all the NASs within the NAS cluster of the file lists of the respective NASs; and a backup continuing unit that continues the backup by the other NAS based on the file list at or after a point of time when the fault occurred.

20. The control system of a NAS according to claim 16, wherein the surrogate backup unit comprises: a reallocation proportional dividing ratio determining unit that acquires the performance information of the NASs taking over the backup and determines a proportional dividing ratio among the respective NASs excluding the fault-occurred NAS based on the performance information; a reallocation list creating unit that creates a new file list, allocated to each of the NASs, of the files at or after a point of time when the fault occurred from the file list of the backup target files of the fault-occurred NAS according to the proportional dividing ratio; and a reallocation list notifying unit that sends the new file list to each of the NASs excluding the fault-occurred NAS.

* * * * *